:::
United States Patent Office 2,919,275
Patented Dec. 29, 1959

2,919,275

PURIFICATION OF PIPERAZINE

George R. Bond, Jr., Paulsboro, N.J., assignor to Houdry Process Corporation, Wilmington, Del., a corporation of Delaware No Drawing. Application July 30, 1957
Serial No. 675,013

4 Claims. (Cl. 260—268)

The present invention relates to the purification of piperazine and is particularly concerned with the preparation of high purity piperazine in good yields through the formation of a piperazine salt and regeneration from such salt. The method of the invention is also applicable to purification of N-methyl piperazine, and other N-alkyl and C-alkyl piperazines.

Piperazine is a chemical of increasing importance in present day markets because of certain advantageous uses such as an anthelmintic for veterinary practice, as dietary additives in animal feeds, as for poultry and hogs, and as possible starting material for synthesis reaction. For specific and particular uses, particularly for uses entailing animal consumption and in connection with the utilization in chemical products having high standards with regard to odor, a high degree of chemical purity is both desirable and necessary.

A number of processes have been suggested for the production of piperazine. Many of these processes start with the alkylene polyamines, or through reaction of hydroxy-alkyl amines, or by the reaction of alkyl amines and glycols, with one of the more favored reactions starting with ethylene polyamines, such as ethylene diamine, diethylene triamine, triethylene tetramine, and the like. Most of the operations, while producing a product in a relatively wide range of yields based on the process and starting material, produce not only piperazine, but co-products and by-products which may be toxic or malodorous or off color, and which have been difficult and expensive to remove from the final desired piperazine product. The usual separation problems exist in connection with the separation of the piperazine from the unreacted starting material.

The prior art patents and literature have suggested a number of processes for the separation and purification of piperazine; including, highly selective distillation, solvent extraction, crystallization and to some degree chemical means. It has also been shown that certain salts have been formed from aqueous and/or non-aqueous solutions by treatment with certain acids including picric, citric, oxalic and the like. For example, in U.S. No. 2,537,004 citrate salts of piperazine derivatives have been separated from ketone solution.

A variety of methods have been used likewise for the determination of piperazine by the preparation of a piperazine derivative, such as piperazine phosphomolybdate, or piperazine molybdate precipitated from aqueous solution, and other means including the classic insoluble picrate salt formation method.

By the present invention a new and improved procedure is afforded for both quantitative determination of piperazine in mixtures containing the same, and for the separation and recovery of highly purified piperazine in quantitative yields. The invention is also applicable to purification and recovery of N-methyl piperazine from crude compositions thereof. In the interest of brevity the description is mainly directed to the recovery of piperazine but is not limited thereto. By practice of the invention, a mixture containing at least 1.0% piperazine can be treated simply and effectively to recover therefrom substantially all of the piperazine in a highly purified form.

In accordance with the invention, crude piperazine, as obtained from any synthesis method is dissolved in acetone, and acetic acid added thereto to precipitate the piperazine selectively as the diacetate; the recovered precipitate may then be regenerated to recover therefrom substantially all of the piperazine in pure form.

While it has been recognized that piperazine forms salts with many organic acids such as picric, tartaric, salicyclic, thiocarbamic, citric, carbonic, sulfanilic, and others, and also with many inorganic acids such as hydrochloric, sulfuric, phosphoric, pyrophosphoric, and the like, and likewise with many complex salts including ammonium molybdate, ammonium phosphomolybdate, and the like there has been no recognition or realization of the selective precipitation of the diacetate salt in the system herein disclosed. While the formation of diacetate salt as such is known, its formation has been through the debenzylation in acetic solution of dibenzyl piperazine by reduction with PdO.

Prior techniques in the salt formation have been to dissolve the impure piperazine in water or acidulated water, clarifying the solution by filtration, with subsequent addition of the salt forming agent in aqueous solution. Crystallization under these conditions of the formed salts from the aqueous solution is good in some cases but not complete. Further, it has been found that related salt-forming compounds such as alkyl piperazines, pyrazines, and the like are precipitated concomitantly with the piperazine and a high degree of purity in the product has not been obtained except through multiple recrystallization stages.

In contrast to the above described process, the present invention provides a system of crystallization from a selective organic solvent with the separation selectively and substantially quantitatively of only the piperazine, yielding a product of high purity either as the salt or as piperazine regenerated from the salt. In the preferred practice of the invention, the piperazine-containing crude product is dissolved in acetone amounting to approximately 5 to 100 volumes of acetone per volume of piperazine at or slightly above room temperature, not over 40° C., to form an acetone solution containing in the range of about 0.5 to 20% by weight of piperazine, adding at least a stoichiometric and up to five times the stoichiometric amount of acetic acid to form the piperazine diacetate, thus precipitating the crystalline piperazine diacetate, preferably at or below room temperature, preferably in the range of 10° to 30° C., which precipitated salt is readily separated and recovered. Certain other ketones, such as methyl ethyl ketone, can be substituted for acetone but do not appear to yield as satisfactory a diacetate precipitate. The salt is readily filtered and easily washable with acetone to produce a pure white crystalline material which sublimes above 90° C. and melts at about 200° C., and consists of substantially pure piperazine diacetate. The salt may be used as is or may be regenerated to obtain pure piperazine as by caustic hydrolysis. If desired, the diacetate can be converted directly to salts of higher molecular weight organic acids by direct metathesis.

While the existence of piperazine diacetate is known, by the present method the same is made available in bulk quantities at lower costs and opens many possibilities for use of the diacetate salt, per se. The diacetate, for example, may be used in organic synthesis and in the promotion of organic reactions, for example, as a basic (mild) condensing agent in the Knoevenagel reaction; or as effective parasitic worm killing agents (anthelmintic); or as surface parasite toxic treating agents. Purified piperazine has all of the well-known uses available thereto and the extension of such uses as require bulk quantities of high purity piperazine.

In addition to this favorable phenomenon regarding piperazine, it has been found that the method is likewise applicable to the purification of N-methyl piperazines. This feature is in no conflict with the separation and purification of piperazine in that the methods of piperazine synthesis are such that the N-methyl derivatives usually are not produced simultaneously therewith in anything more than trace amounts, if at all. N-ethyl and other N-alkyl derivatives as well as pyrazine, di- and tetrahydropyrazines, N-aminoethyl-, N-hydroxyethyl- and other N-substituted co-formed compounds with piperazine are quite readily separated from the piperazine and from any N-methyl piperazine diacetates as may be present in a manner both selective and substantially quantitative.

Thus,

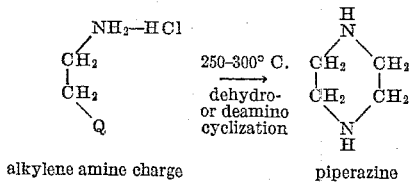

alkylene amine charge — piperazine

Wherein Q is hydroxy, halogen, amino, or it is OR or NHR wherein R is an alkyl group of at least 2 carbon atoms containing an amino or hydroxy group in the beta position of said group. When functional groups are on vicinal carbon atoms, as shown above, a diazocyclohexane derivative is formed, such as piperazine, and no or essentially no N-methyl piperazines (which would require the fracture of a carbon-carbon bond in the highly stable ethylenic structure).

On the other hand, with reagents falling within the category of amino-alkyl compounds encompassed by the generic formula above, in addition to the desired piperazine, N-ethyl-, N-$\beta$-aminoethyl-, N-$\beta$-hydroxyethyl-derivatives of piperazine are obtained in varying proportions depending upon the reactants and conditions chosen for the reaction. For instance, principal by-products include (1):

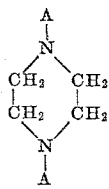

where one or both of the A substituents are beta-aminoethyl, or beta hydroxyethyl, etc., and (2) the more complex diazabicyclooctane of the formula:

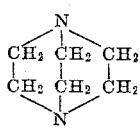

and other possible products related thereto, such as pyrazines, hydropyrazines, and the like.

*Example I*

By way of control, it was experimentally established that ethylene diamine dissolved in acetone and treated with glacial acetic acid gave no precipitate; likewise pyrazine dissolved in acetone with added acetic gave no precipitate. It was found further that varying amounts of both ethylene diamine and pyrazine together in acetone solution when treated with acetic acid gave no precipitate.

A 0.47 g. sample of commercial piperazine was dissolved in acetone to make 50 ml., and separated into several aliquot portions, which were tested as follows.

A 25 ml. aliquot was treated with 0.2 ml. of glacial acetic acid. A voluminous white precipitate formed which was filtered, washed repeatedly with cool acetone, and dried under vacuum at 30° C. The product weighed slightly more than 0.52 g., corresponding approximately to 0.24 g. of piperazine.

The second aliquot of 10 ml. was treated with 0.2 ml. of acetic acid and the precipitate was treated as described immediately above. Approximately 0.21 g. of piperazine diacetate was recovered.

Another 10 ml. aliquot had added to it 0.086 g. of ethylene diamine. This sample was treated with 0.4 ml. of acetic acid and the precipitate treated in substantially the same manner. The weight of the recovered dried piperazine diacetate was substantially the same as obtained with the sample having no ethylene diamine added.

The filtrates from the first two aliquot samples (25 and 10) were combined and evaporated to dryness giving less than 0.6 weight percent of unrecovered diacetate. This residue when treated with caustic gave no indication of piperazine, showing that the diacetate recovered by filtration accounted for substantially all of the piperazine present in the sample.

*Example II*

A commercial-type product containing piperazine from conversion of a charge stock comprising about 30% diethylene triamine and the balance recycle from previous runs was shown by mass spectrometer analyses to contain 34.3% by volume piperazine, 40.2% 1,4-diazabicyclooctane and about 25% somewhat related co-products. A sample composed of 1.397 grams of product from this run, containing on the basis of such analysis about 0.48 gram of piperazine, was dissolved in acetone and made up to a volume of 100 ml. Half of this sample was made acid with glacial acetic acid (0.5 ml.) and the resultant precipitate was filtered, washed thoroughly with cooled acetone, and vacuum dried at room temperature. The weight of the dried precipitate was approximately 0.71 g. piperazine diacetate, equivalent to approximately 0.3 g. piperazine. This weighed product shows a slightly higher percentage of piperazine in the sample than indicated by the mass spectrometer analysis, or approximately 40% by weight piperazine by the gravimetric method compared to the 34.3% by volume (about 38.5% weight) shown by the mass spectrometer analyses.

*Example III*

A sample of piperazine hexahydrate was tested for purity. The sample of 0.342 g. was dissolved in acetone and glacial acetic acid added in an amount of approximately four times the weight of the hexahydrate. The precipitate was separated by filtration, washed thoroughly with cooled acetone and dried in vacuum at room temperature. The product was weighed as the diacetate and converted to equivalent piperazine weight. On the basis of the theoretical composition of pure piperazine hexahydrate, the test showed a purity of about 95%.

*Example IV*

Piperazine diacetate amounting to 7.6 parts by weight is treated with 10 parts by weight of sodium hydroxide in a 30% by weight aqueous solution. When reaction is complete the mixture is subjected to careful fractionation with separation and recovery of the regenerated piperazine amounting to 3.17 parts by weight (99.0% of the theoretical amount of piperazine based on the original piperazine diacetate). The freezing point of the recovered piperazine is 109.5° C., indicative of extremely high purity. This piperazine has an unusually mild odor, much more pleasant than piperazine from other sources.

*Example V*

A distillate fraction of synthetic piperazine boiling in the range of 130–160° C. was subjected to analysis, Approximately 0.88 g. was dissolved in about 90 ml. of acetone and made acid with 1.6 ml. of glacial acetic acid. The precipitate was filtered, washed and dried. The weighed sample amounted to 1.94 g. of piperazine diacetate or the equivalent of 92.5% piperazine.

*Example VI*

A sample of piperazine diacetate obtained from the acetic acid treatment of an acetone solution of the commercial-type product of Example II amounting to 2.97 g. was admixed with 1.95 g. of citric acid (monohydrate). The mixture was evaporated to dryness with the evolution of acetic acid. The product was extracted with alcohol and dried with the recovery of 3.25 g. of piperazine citrate. (Theoretical product on amount of piperazine used would be equal to about 3.15 g.) The recovered piperazine citrate was substantially free of any offensive odor.

Similarly, F.D.A. acceptable phosphate and hydrochloride piperazine of good odor are obtained upon similar treatment of the diacetate of the present invention with either phosphoric acid or hydrochloric acid respectively.

*Example VII*

Several samples of sublimed piperazine from a distillate fraction (synthetically prepared) were precipitated by acetic acid from acetone solution containing varying amounts of water. The starting sample was divided into several 10 ml. aliquots which were tested with 0, 1, 2, 3, 4 and 5 ml. of water added to the aliquot. It was found that when 4% or less of the aliquot was water the recovery of piperazine was at least 99.6% complete. With 6 through 10% of water present, recovery was no better than 96.7%. It was found further that a higher ratio of piperazine to acetone than in the preceding tests results in an improvement in piperazine recovery; such that when the amount of piperazine weight is increased approximately 10% in the acetone solution, 99% or better recovery of piperazine could be obtained with water content in the solution as high as 6%.

*Example VIII*

A comparison of the piperazine diacetate (gravimetric) analysis with an electrometric titration of the two amino groups in piperazine was made using a fractionated cut of synthetic piperazine boiling in the range of 145–150° C.

A sample (0.996 g.) of this piperazine cut was put in solution, first, with 5 ml. $C_2H_5OH$ and then with added acetone to 200 ml. of solution. 25% aliquots were taken for analysis, precipitating with 0.4 ml. acetic acid, filtering, washing, drying, etc.

|  | 1 | 2 |
|---|---|---|
| Piperazine diacetate, g | 0.583 | 0.583 |
| Piperazine, by diacetate, Percent | 97.6 | 97.6 |
| Piperazine, titrimetric, Percent | 97.42±0.1 |  |
| Water in piperazine, Percent | 0.48±0.01 |  |

Analysis of another portion of the same synthetic piperazine by mass spectrometer showed:

| | Percent |
|---|---|
| Piperazine | 98.0 |
| Pyrazine | 0.1 |
| Methyl pyrazine | 0.1 |
| Ethyl pyrazine | 0.1 |
| Methyl piperazine | 0.2 |
| Other components—Bicyclic amines | 1.5 |
| | 100 |

Obviously, many modifications and variations of the present invention as hereinbefore set forth may be made without departing from the spirit and scope thereof and therefore only such limitations should be imposed as are indicated in the appended claims.

I claim:

1. A method of separating piperazine from mixtures containing in addition to at least 1% piperazine significant quantities of contaminant obtained as reaction by-products in the formation of piperazine from an amino-ethyl compound by condensation and ring closure, said contaminant being at least one compound selected from the group consisting of ethylene polyamines, pyrazines, diazabicyclo-octane, N-alkyl piperazines, N-amino alkyl piperazines and N-hydroxyalkyl piperazines, wherein any of said alkyl groups contains at least two carbon atoms; said method comprising: dissolving the piperazine-containing mixture in acetone, adding to the obtained solution acetic acid in an amount at least equal to the stoichiometric quantity to form piperazine diacetate, and separating the obtained precipitate of piperazine di-acetate from the remaining liquid, said precipitate containing substantially all of the piperazine originally present in said piperazine-containing mixture.

2. A method of separating piperazine from mixtures containing in addition to at least 1% piperazine significant quantities of contaminant obtained as reaction by-products in the formation of piperazine from an aminoethyl compound by condensation and ring closure, said contaminant being at least one compound selected from the group consisting of ethylene polyamines, pyrazines, diasabicyclo-octane, N-alkyl piperazines, N-amino alkyl piperazines and N-hydroxyalkyl piperazines, wherein any of said alkyl groups contains at least two carbon atoms; the method which comprises: dissolving the piperazine-containing mixture in acetone at a temperature in the range of 20–40° C., forming an acetone solution containing about 0.5 to 20 weight percent piperazine, adding glacial acetic acid in a quantity of at least stoichiometric and up to 5 times the stoichiometric amount necessary to form piperazine diacetate, precipitating crystalline piperazine diacetate at a temperature in the range of 10–30° C., and separating the precipitated piperazine diacetate from the remaining liquid, said precipitate containing substantially all of the piperazine originally present in said mixture.

3. The method of separating N-piperazine as acetate salt from crude mixtures containing the same in association with other N-alkyl derivatives of piperazine having at least two carbon atoms in the alkyl group, said method comprising: adding to such mixture about 5 to approximately 100 volumes of acetone per volume of N-methyl piperazine present, clarifying said solution by removing undissolved materials therefrom, adding glacial acetic acid to said clarified solution in a quantity equivalent to 1–5 times the stoichiometric amount necessary for the formation of N-methyl piperazine acetate, thereby effecting precipitation of crystalline N-methyl piperazine acetate at a temperature in the range of 10–30° C., and separating the precipitate from the remaining liquid to recover substantially pure N-methyl piperazine acetate.

4. The method for the preparation of high purity anthelmintic salts of piperazine characterized by substantial freedom from objectionable odor, from a reaction mixture obtained in the formation of piperazine from an ethylene polyamine by condensation and ring closure, which reaction mixture contains in addition to piperazine a reaction by-product from the group consisting of ethylene polyamines, pyrazines, diazabicyclo-octane, N-alkyl piperazines, N-amino alkyl piperazines and N-hydroxyalkyl piperazines, wherein any of said alkyl groups contains at least two carbon atoms; said method comprising: dissolving the mixture in acetone, adding acetic acid to the obtained solution in an amount at least equal to the stoichiometric amount necessary to form piperazine diacetate, thereby precipitating the piperazine diacetate, recovering the solid piperazine diacetate by separation of residual liquid from said precipitate, treating the recovered diacetate with a suitable acid from the group consisting of citric, phosphoric and hydrochloric acid, to convert the diacetate to the anthelmintic salt of such treating acid, evaporating the obtained liquid mixture, extracting the resulting solid residue with suitable liquid solvent for said anthelmintic salt and drying the extract.

References Cited in the file of this patent

UNITED STATES PATENTS 2,451,645  Zienty et al. _____ Oct. 19, 1948

OTHER REFERENCES

Kodera et al.: Chem. Abst., vol. 48, p. 729 (1954).
Pollard et al.: Jour. Am. Chem. Soc., vol. 56, pp. 1759–1760 (1934).